United States Patent [19]

Takemura et al.

[11] 4,347,909
[45] Sep. 7, 1982

[54] TWO-WHEELED MOTORCYCLE WITH PIVOTABLE SEAT ARRANGEMENT

[75] Inventors: Hiroo Takemura, Wako; Azusa Noda, Tokyo, both of Japan

[73] Assignee: Honda Giken Kogyo Kabushiki Kaisha, Tokyo, Japan

[21] Appl. No.: 167,779

[22] Filed: Jul. 14, 1980

[30] Foreign Application Priority Data

Jul. 16, 1979 [JP] Japan ............................. 54-98243[U]

[51] Int. Cl.³ ...................... B62K 11/08; B60R 11/06
[52] U.S. Cl. .................................. 180/219; 180/225; 280/281 B
[58] Field of Search ............... 180/219, 225, 227, 229; 280/281 B, 281 R

[56] References Cited
U.S. PATENT DOCUMENTS 2,755,873 7/1956 Klave .................................. 180/225
4,171,731 10/1979 Hilber ................................. 180/219

FOREIGN PATENT DOCUMENTS 713932 8/1954 United Kingdom ............... 180/225

Primary Examiner—Joseph F. Peters, Jr.
Assistant Examiner—Donn McGiehan
Attorney, Agent, or Firm—Armstrong, Nikaido, Marmelstein & Kubovcik

[57] ABSTRACT

A two-wheeled motorcycle includes a shell made of thin plates to the front end of which a head pipe is fixed. The shell is opened at its rear side and a rear wheel driving power unit is accommodated by and fixed to the shell. A seat stay carrying a rider's seat and covering the upper part of the rear wheel is pivotally secured at its front end to the shell so as to be rotated upward. A fuel tank is disposed ahead of the rider's seat and pivotally secured at its front end to the shell so as to be rotated upward.

4 Claims, 2 Drawing Figures

TWO-WHEELED MOTORCYCLE WITH PIVOTABLE SEAT ARRANGEMENT

BACKGROUND OF THE INVENTION

1. Field of the Invention

The present invention relates to a two-wheeled motorcycle of a type in which a power unit is enveloped by a shell constituting at least a part of the chassis.

2. Description of the Prior Art

In two-wheeled motorcycles, the acceleration performance, driving performance and various other performances are largely affected even by a slight change of the weight, and various measures have been taken to reduce the weight of the two-wheeled motorcycles. However, the reduction of weight of prior art designs has almost reached a limit in the cases of conventional construction of two-wheeled motorcycles in which the chassis frame is constructed of steel pipes or plates. The chassis frame is generally made with sufficient strength by itself and a power unit is mounted on the chassis frame. In such cases, further lightening of the frame to reduce weight thereof, weakens the strength thereof to the point where the frame is useless.

SUMMARY OF THE INVENTION

It is, therefore, a major object of the invention to provide a two-wheeled motorcycle in which a power unit serving also as a mechanical strength member is accommodated by and fixed to a shell made of thin plates. The shell constitutes at least a part of the motorcycle chassis to reduce the weight of the motorcycle as a whole remarkably as compared with a cycle of conventional construction. The shell also makes it possible to envelope the power unit without using any specific cover. The invention is also characterized by a seat stay carrying a rider's seat and covering the upper part of the wheel. The seat stay is pivotally attached at its front end to the shell so that it may be swung upwardly to facilitate the inspection and maintenance of the power unit and the rear wheel.

The above and other objects, features and advantages of the invention will become apparent from the following detailed description of the invention when taken in conjunction with the accompanying drawings, which illustrate a presently preferred embodiment constructed in accordance with the principles of the invention.

DESCRIPTION OF THE PREFERRED EMBODIMENTS

Figure 1:
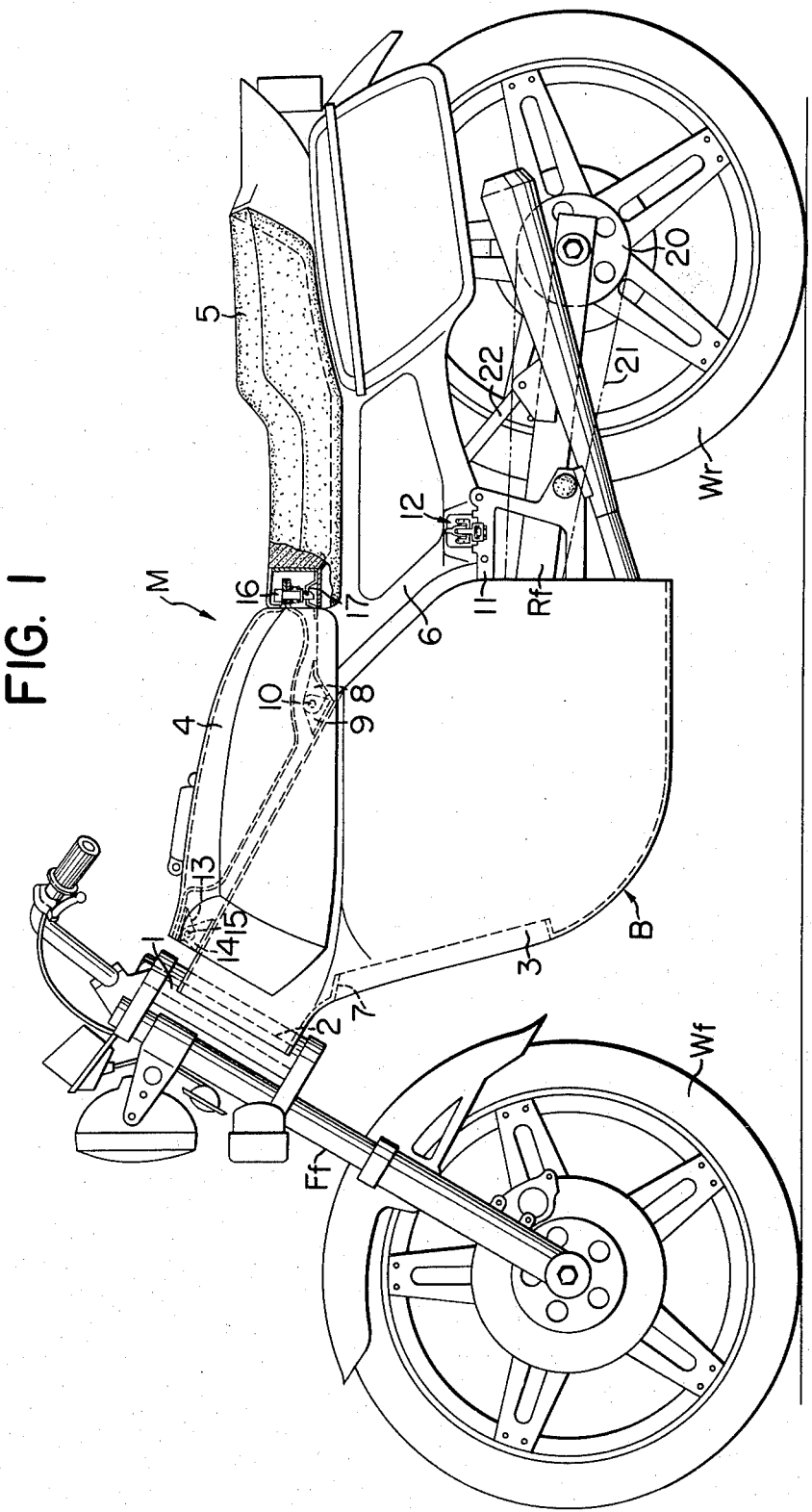
FIG. 1 is a side elevational view of a two-wheeled motorcycle constructed in accordance with an embodiment of the invention.

A preferred embodiment of the invention will be described hereinunder with reference to the accompanying drawings.

A two-wheeled motorcycle M of the invention has, as its major constituents, a chassis B provided at its front end with a head pipe 1, a front fork Ff carried by the head pipe 1 through a steering shaft 2 and supporting a front wheel Wf, a power unit P accommodated by the chassis B, and a rear fork Rf pivotally secured to the power unit P and carrying at its free end the both ends of a rear wheel axle.

The chassis B is constituted by a shell 3 made of thin plates and extending rearwardly downwardly. The head pipe 1 is fixed to the front end of the shell 3; a fuel tank is fixed to the shell 3 at the front portion thereof to saddle over the latter; and a seat stay 6 carrying the rider's seat 5 is pivotably connected to the rear upper portion of the shell 3 so as to cover the upper part of the rear wheel. The rear end of the fuel tank is detachably secured to the front end of the seat stay. The shell 3 generally has a streamlined form constituted by a front plate, left and right side plates, a top plate and a bottom plate. An air introduction port 7 is formed in the front plate; the rear end of the shell 3 is open. The power unit P is placed inside the shell 3 and is fixed to the latter by bolts or the like means (not shown) to serve as a mechanical strength member of the shell 3.

Pairs of hinge brackets 8,9 are fixed to the front end of the seat stay 6 and the rear end of the top plate of the shell 3 confronting the front end of the seat stay 6. These brackets are connected by a hinge pin 10 extending transversely of the chassis so that the seat stay 6 may be swung upwardly from the normal horizontal position.

A known toggle connecting member 12 is connected between the seat stay 6 and a step bracket 11 disposed beneath the seat stay 6 and fixed to the power unit P, so as to restrain the seat stay from being swung to hold the same in the horizontal position.

Pairs of hinge brackets 13,14 are fixed to the front end of the fuel tank 4 and the opposing portion of the chassis 3. These bracket 13,14 are connected by a hinge pin 15 extending transversely of the chassis so that the fuel tank 4 is swingable upwardly from the normal horizontal position. In order to retain the fuel tank 4 at the horizontal position, a movable retaining member 16 provided at the rear end of the fuel tank 4 is engaged by a stationary retaining member 17 provided on the seat stay 6.

The rear fork Rf is pivotally secured at its base end to the rear parts of the right and left side walls of the power unit P by means of a pivot shaft 18 for up and downward swinging movement. The power unit P has an output shaft disposed coaxially with the pivot shaft 18. A chain 21 is stretched between a driving sprocket wheel 19 fixed to the output shaft and a sprocket wheel 20 fixed to the hub of the rear wheel Wr, so that the driving power from the power unit P is transmitted through the driving sprocket wheel 19, chain 21 and the sprocket wheel 20 to the rear wheel Wr to drive the latter. Since the driving sprocket 19 is disposed coaxially with the output shaft of the power unit P, no slacking nor tensioning of the chain 21 takes place during swinging of the rear fork Rf.

A bifurcated link 22 straddling the rear wheel Wr is pivotally secured at its base end to intermediate portions of the left and right legs of the rear fork Rf. A swingable link 23 secured at its end to the end of the bifurcated link 22 is pivotally secured at its base end to the aforementioned step bracket 11. A shock absorber 24 having a sole suspension spring is interposed between the swingable link 23 and the upper end of the power unit P. Therefore, the up and downward swinging motion of the rear fork Rf causes a forward and backward swinging motion of the swingable link 23 through the action of the bifurcated link 22 to impart an expanding and contracting motion to the shock absorber 24 thereby to absorb the shock transmitted from the rear wheel.

Figure 2:
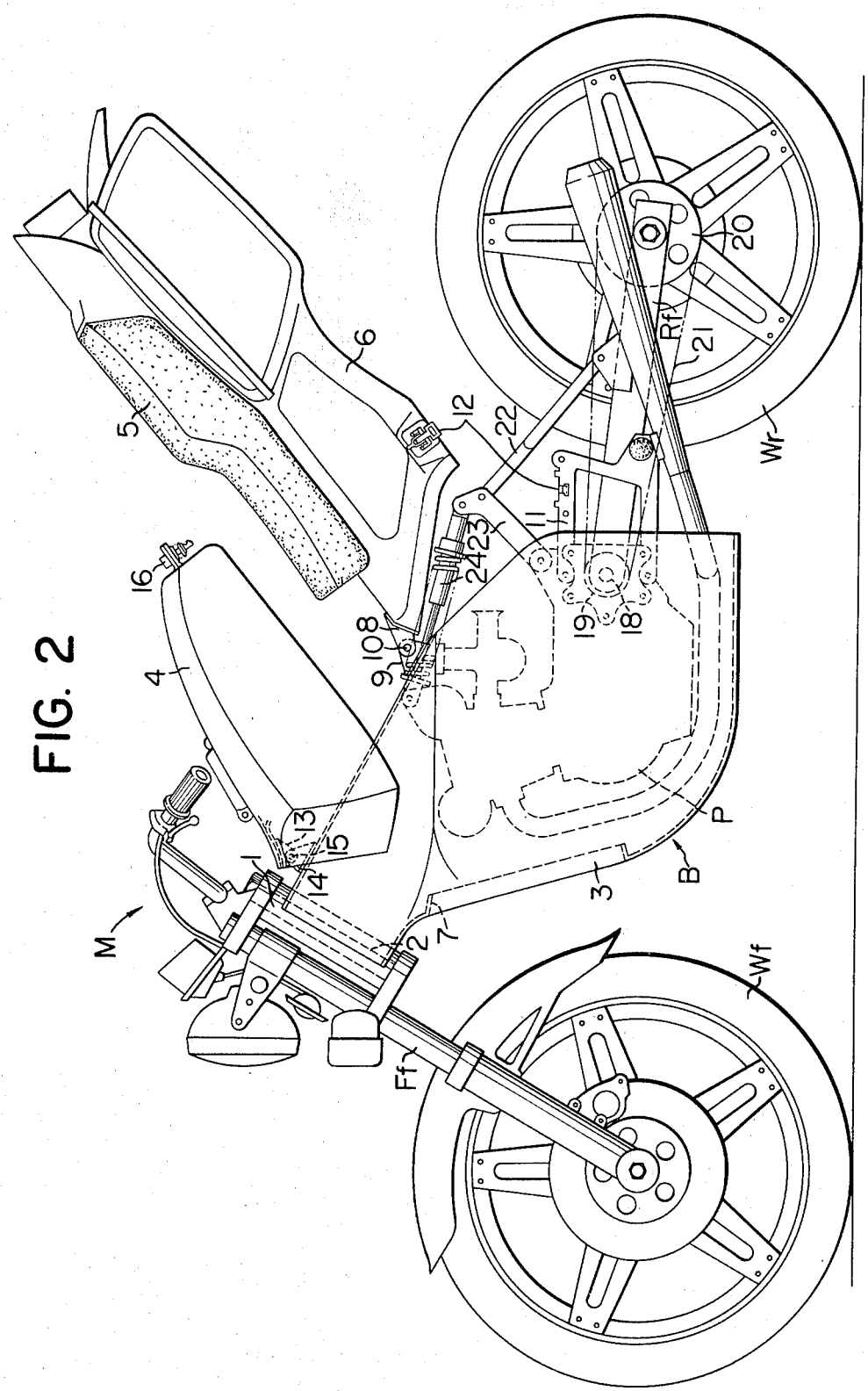
FIG. 2 is a side elevational view of the two-wheeled motorcycle shown in FIG. 1 under inspection and maintenance work.

In the two-wheeled motorcycle of the invention having the described construction, the open rear end of the shell and the upper part of the rear wheel are exposed when the fuel tank 4 and the seat stay 6 are successively swung upwardly as shown in FIG. 2. This is accomplished by disengaging the retaining members 16,17 from each other and disengaging the toggle connecting member 12. It is therefore possible to effect inspection and maintenance work such as adjustment of carburetor of the power unit P from the rear opening of the shell 3 after the seat stay 6 is swung upwardly. Additionally, renewal of the shock absorber 24, mounting and demounting of the rear wheel after and before a repair, and so forth can be easily made without being hindered by the seat stay 6.

As has been described, according to the invention, the weight of the chassis and, hence, the weight of the motorcycle as a whole is remarkably reduced to ensure superior performances of the motorcycle such as acceleration performance, driving performance and so forth. In addition, it is possible to reduce the air resistance encountered during running of the motorcycle by designing the shell in the form of a cowling for the power unit.

Furthermore, since the seat stay covering the upper part of the rear wheel is pivotally secured at its front end to the shell, the open rear end and the thereby accessible rear upper portion of the shell and the rear wheel can be exposed by a simple upward swinging of the seat stay. This permits easy and prompt inspection and maintenance of the portion of the motorcycle including the power unit and the rear wheel.

If the rear end of the fuel tank is connected to the rider's seat, the fuel tank is preferably pivotally secured at its front end to the shell so as to be swung upwardly as in the described embodiment. By so doing, it is possible to locate the point of pivotal connection between the seat stay and the shell at a position as close as possible to the front end of the chassis without being interfered by the fuel tank to provide a larger working space after the upward swinging of the seat stay.

What is claimed is:

1. In a two-wheeled motorcycle including a shell of thin plates having a head pipe at its front end and being open at its rear side, a rear wheel driving power unit disposed in and fixedly secured to said shell, a rear fork pivotally mounted on said power unit and supporting a rear wheel, a seat stay covering the upper part of said rear wheel and the rear upper portion of said shell, a rider's seat carried on said seat stay, and a shock absorber for damping vertical movements of said rear wheel, the improvement wherein said shell has its rear upper portion formed open, said rear upper shell portion being covered with said seat stay; said seat stay is pivoted at its front end to the rear upper portion of said shell for upward rotation; and said shock absorber is connected between said power unit and said rear fork and covered with said seat stay.

2. A two-wheeled motorcycle as claimed in claim 1, further comprising a fuel tank disposed ahead of said rider's seat and pivotally secured at its front end to said shell so as to be rotated upward.

3. A two-wheeled motorcycle as claimed in claim 2, wherein said fuel tank is detachably secured at its rear end to the front end of said seat stay.

4. A two-wheeled motorcycle as claimed in claim 1, further comprising a toggle connecting member interposed between said seat stay and a step bracket which is disposed beneath said seat stay and fixed to said power unit, said toggle connecting member restraining the upward swinging of said seat stay to hold the latter at the horizontal position.

* * * * *